United States Patent [19]

Klobbie

[11] 4,187,352

[45] Feb. 5, 1980

[54] METHOD AND APPARATUS FOR PRODUCING SYNTHETIC PLASTICS PRODUCTS, AND PRODUCT PRODUCED THEREBY

[75] Inventor: Eduard J. G. Klobbie, Sneek, Netherlands

[73] Assignee: Lankhorst Touwfabrieken B.V., Sneek, Netherlands

[21] Appl. No.: 884,271

[22] Filed: Mar. 7, 1978

[30] Foreign Application Priority Data

Apr. 19, 1977 [NL] Netherlands .......................... 7704265

[51] Int. Cl.² .......................................... B29D 27/00
[52] U.S. Cl. .......................................... 521/79; 264/45.3; 264/50; 264/54; 264/176 R; 264/323; 264/328; 264/DIG. 69; 264/DIG. 83; 425/4 R; 425/576; 425/817 R; 521/81; 521/134; 521/143
[58] Field of Search .................. 264/51, 53, DIG. 83, 264/122, 123, 109, 323, 45, 3, 50, 54, 176 R, 328, DIG. 69; 425/392, 393, 377, 4 R, 576, 817 R; 521/79, 81, 134, 143

[56] References Cited

U.S. PATENT DOCUMENTS

| | | | |
|---|---|---|---|
| 1,819,277 | 8/1931 | Carpenter | 425/576 |
| 2,026,439 | 12/1935 | Sanial | 425/576 X |
| 2,375,955 | 5/1945 | Smith | 425/377 X |
| 2,665,648 | 1/1954 | Vogt | 425/377 |
| 2,923,034 | 2/1960 | Dickie et al. | 264/123 |
| 3,342,913 | 9/1967 | Engel | 264/51 |
| 3,425,092 | 2/1969 | Taga | 264/323 X |
| 3,479,429 | 11/1969 | Morshauser et al. | 264/75 X |
| 3,500,541 | 3/1970 | Hammerlund et al. | 425/377 X |
| 3,774,811 | 11/1973 | Staerman | 264/DIG. 83 |

OTHER PUBLICATIONS

Collins, F. H., "Controlled Density Polystyrene Foam Extrusion", in *SPE Journal,* Jul. 1960, pp. 705–709.

*Primary Examiner*—Philip Anderson
*Attorney, Agent, or Firm*—Lawrence E. Laubscher

[57] ABSTRACT

A process for working up thermoplastic synthetic resin material, in particular unsorted thermoplastic synthetic resin waste material into an article having the working and processing properties of wood, and in which the material is subjected to a mixing operation in a housing including a screw member, and is fluidized, moulded, cooled in the mould, and removed from the mould. According to the invention, the synthetic resin material is supplied to an extruder without a screen member and without an extrusion nozzle, and kept therein until there is obtained a material that is fluid owing to temperature increase, and which material contains a gas when it leaves the extruder. The material is then passed into a mould having open ends, one of which is connected to the outlet of the extruder.

6 Claims, 2 Drawing Figures

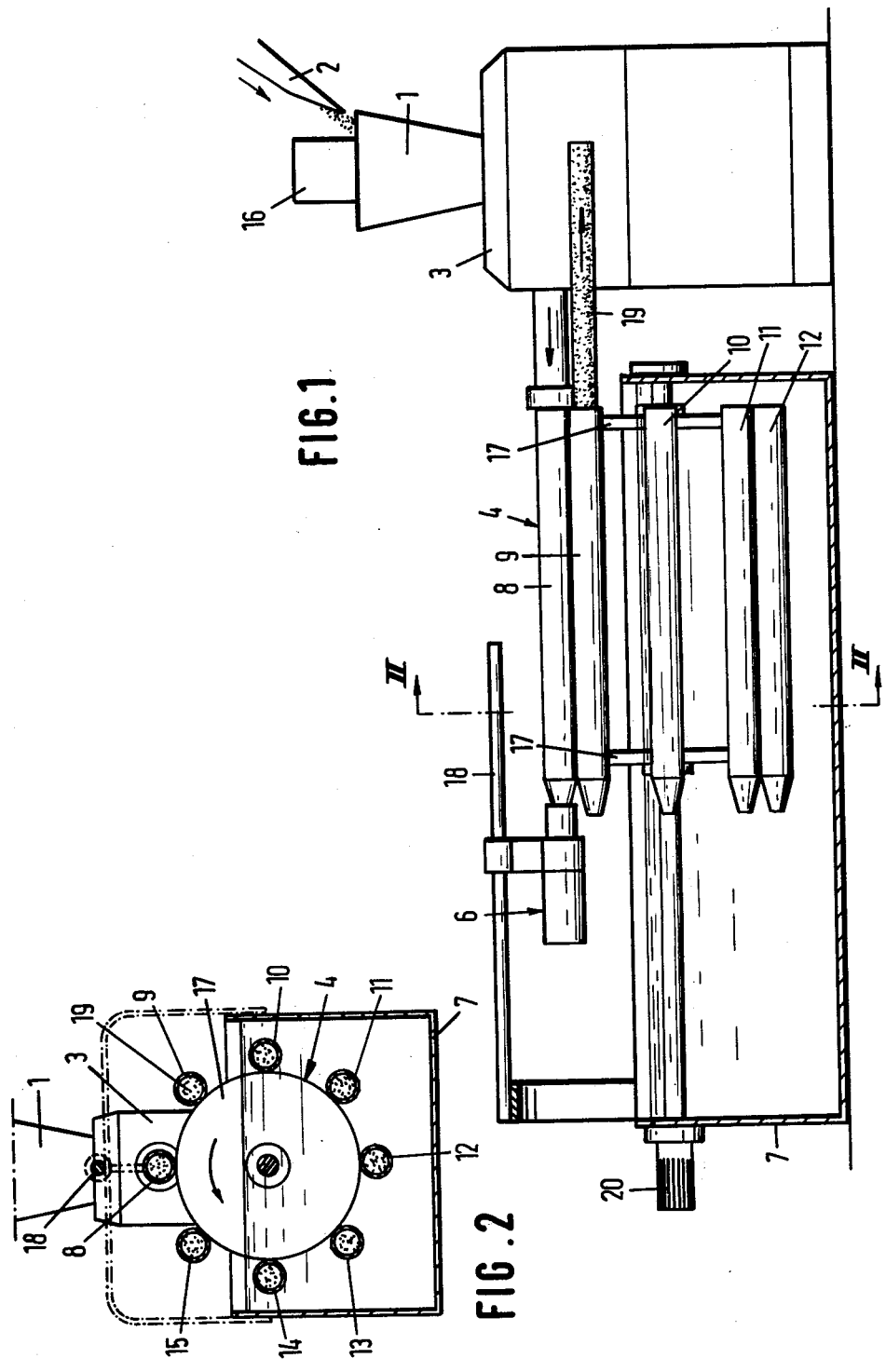

METHOD AND APPARATUS FOR PRODUCING SYNTHETIC PLASTICS PRODUCTS, AND PRODUCT PRODUCED THEREBY

BRIEF DESCRIPTION OF THE ART

This invention relates to a process for working up thermoplastic synthetic material in particular unsorted thermoplastic synthetic waste material, into an article having the working and processing properties of wood, in which the synthetic material is subjected to a mixing operation in a housing including a screw member, and is fluidized, moulded, cooled in the mould and removed from it.

Such a process for working up synthetic waste material is known by the name of "Reverzer" process, introduced by the Japanese Company Mitsubishi Petrochemical, and mentioned by Shiro Hamava in "Japans Plastic Age", Vol. 12, Feb. 1974, pp 43–52, in particular pp 46–48, and furthermore described in a leaflet on the process, published by the Japanese company. According to this process, sorted or unsorted thermoplastic waste material of for example, polyethylene, polypropylene, polyvinyl chloride or mixtures thereof, is comminuted, and the particulate material is subsequently stored in a storage space. In it, the particulate material is dried to a certain extent, using the heat released during the comminution of the waste material. From the storage space the particulate waste material is supplied to the "Reverzer"-unit, which in essence is a melting unit, comprising a hoppper, in which the material is softened, and a mixer comprising a screw member, in which the material is also fluidized. The fluid material is then injected under pressure into a closed mould, and thus moulded. The moulds are then transported to a cooling space, and cooled therein by being sprayed with water, the moulds are opened and the moulded product is removed. The resulting products may have the form of possibly tapered beams, frames, U-beams, etc. depending on the mould used. In this prior process, a high pressure is built up in the mixing and fluidization stage of the apparatus used, under the influence of which, as stated, the fluid material is injected into special pressure-resistant mould.

SUMMARY OF THE INVENTION

It is an object of the present invention to provide a process for working up thermoplastic, synthetic material into shaped articles, in which specially adapted, pressure-resistant apparatus is unnecessary, but commercially available, non-pressure-resistant apparatus and dies or moulds can be used.

According to the present invention, there is provided a process for working up thermoplastic synthetic material, in particular unsorted thermoplastic synthetic waste material into an article having the working and processing properties of wood, in which the synthetic material is subjected to a mixing operation in a housing comprising a screw member, and is fluidized, moulded, cooled in the mould and removed from the mould, characterized in that the synthetic material is supplied to an extruder without a screen member and without an extrusion nozzle, and kept therein until there is obtained a material that is fluid owing to an increase in temperature, and which material contains a gas when it leaves the extruder, and which is then passed into a mould that is open on opposite ends, one of which ends is connected to the outlet of the extruder.

The process according to the present invention can be carried out using any known, commercially available screw extruder, which may be of the adiabatic or of the normal type, but from which the pressure-producing components (normally leading to pressures of 100–450 kg/cm$^2$), that is to say, the screen pack or the exchanger and the extrusion nozzle, should be removed. The screw-type extruder is thus in essence transformed into a screw conveyer, approximately like a meat mincer. The moulding operation, which in the process of this invention is carried out in a separate step, should be effected in an open mould. As the material to be moulded is introduced without pressure, tubes of round or rectangular cross-section, of simple standard quality can be used for making, for example, round or rectangular poles or beams. The mould-filling pressure is provided in the process of this invention by the moulding gas available in the fluid material to be moulded.

The moulding gas can be obtained by providing the particulate synthetic material to be supplied to the extruder with a blowing agent, the threshold temperature of which is exceeded at the temperature occurring in the extruder. Suitable blowing agents are, for example, solid granular blowing agents, suitably having a threshold temperature of 150°–270° C., for example, azodicarbonamide (200° C.) diphenylsulfon-3,3'-disulfonyl hydrazide (150° C.), $\beta,\beta$-oxy-bis(benzenesulfonyl semicarbazide) (210° C.).

The proportion of blowing agent can determined by experimentation, it being inter alia dependent on the form of the ultimate product and properties of the thermoplastic material. Suitable proportions are from about 0.4–1.2%, calculated on the weight of the mixture of thermoplastic material and blowing agent.

When a gas is used as the moulding gas, for example, nitrogen or air, this is supplied to the extruder after the thermoplastic synthetic material has been fluidized.

The process of this invention can be applied to all current thermoplastics for example, low- and high-density polyethylene (LD/HDPE), polypropylene (PP), polystyrene, polyvinyl chloride (PVC), ABS in pure of mixed form. Mixtures of good processability are, for example, mixtures of approximately 40% polypropylene+60% HDPE, or 40% propylene+60% LDPE, or 30% polypropylene+40% HDPE+30% polystyrene.

If the process of this invention is applied to synthetic resin waste material, this material will generally not be in a pure state but contain impurities. In the process according to the invention, however, it is not necessary for the waste material to be previously cleaned. Generally speaking, the thermoplastic synthetic resin material to be processed may contain a certain proportion, for example, preferably not higher than 20–25%, non-plastics materials, for example ground paper, card-board, textile fibres, sawdust, cheap filling agents, conventional in the rubber and plastics processing industries (e.g. chalk, talc) and also, for example, a pigment.

Depending on the type of screw extruder used, the material to be processed may be supplied in particulate form or not.

If the material to be processed is waste material, this can be used in the form of a densified waste material or of waste material in granulate form. Depending on the form in which the waste material is supplied to the extruder, unforced supply is possible if the material has a sufficient bulk density, or forced supply if the waste material has a very low bulk density. Forcing can be effected, for example, by means of a densifying screw.

After the moulding of the fluid material in the mould connected to the outlet of the extruder, the mould is cooled, for example, by being introduced into a water bath, which is preferred, or by simply exposing the mould to the air, allowing for a sufficiently long period of cooling, so that the hardened and shrunk product can be removed from the mould. It is recommendable for the product to be then further cooled in the air, for which purpose it is laid on a flat substrate.

The process according to the present invention has many advantages, which can summarized as follows:

The process according to the invention is not critical. Using existing control facilities of normal, commercially available screw extruders, the entire process can be easily controlled. As a screw extruder of the adiabatic type has smaller dimensions, this type is preferred as involving lower costs.

As no screen packet is used in the screw extruder, there is hardly if at all, any risk of clogging of the apparatus, so that the thermoplastic synthetic resin material, in particular synthetic resin waste material, to be processed need not be previously washed of purified. The process according to the invention is also little critical with regard to the composition of the starting material, even to the extent that mixtures of unsorted, different thermoplastic synthetic resin materials turn out to be properly processable.

As there is no pressure build-up in the apparatus in which the process according to the invention is performed, the apparatus need not satisfy any special demands, for example, as regards the screw geometry. Also, the moulds need not satisfy any special requirements with regard to pressure resistance, so that moulds of standard commercial quality may be used.

The moulding operation does not require any calibrating devices. Moulding is achieved exclusively under the influence of expansion of the fluid material in the mould, effected by the gas made available therein.

Cooling of the material within the mould need only be continued until the product can be removed from the mould.

As the process is not critical, it can also be performed by means of a transportable apparatus mounted, for example on a motorlorry. The advantage is that the apparatus can always be installed in places where large quantities of synthetic resin waste material become available.

The process according to the present invention even allows the use of screw extruders declared unfit for normal use.

The surface of the shaped product produced by the process according to the invention has a specific structure rather unlike the surface of a synthetic material. The cause is that the foamed mass in the mould is subjected to the effect of shearing forces at the surface as a result of local solidifying processes while the non-solidified material flows further owing to expansion.

The final product can be worked and processed as wood without any further treatment. Its specific gravity is 0.7 kg/cm$^3$ or higher. The material is chemically resistant, its strenth is adjustable by means of fillers, and the material is generally comparable to hard woods, such as azobe in the wet state. The process according to the invention can of course be applied to thermoplastic synthetic resin material not yet used before, but the greatest advantages of the process can be achieved using thermoplastic synthetic resin waste material.

BRIEF DESCRIPTION OF THE DRAWING

In the accompanying drawings, which by way of example illustrate one embodiment of apparatus suitable for the process according to the present invention.

FIG. 1 shows a diagrammatic side-elevational view of a processing and moulding apparatus; and FIG. 2 shows a cross-sectional view of the moulding section of the apparatus, taken on the line II—II of FIG. 1.

DETAILED DESCRIPTION

In FIG. 1, reference numeral 1 designates a hopper which when mixtures having a low bulk density are used is provided with a supply member 16 for forced supply. Hopper 1 is equipped with an automatic dosaging device 2 for the supply of a blowing agent, either in the powdered form, or in "masterbatch" form. The blowing agent containing mixture is molten in a screw extruder 3. Extruder 3 has no screen packet and no extruder head. It may quite suitably be a short adiabatic extruder. Disposed in the vicinity of the outlet of extruder 3 is a rotating mould holder 4 comprising two disc-shaped supports 17, with which moulds 8-15 are connected. Mould holder 4 is adjustable along a guide rod 18, so that shorter or longer moulds 8-15 can be set up, and is designed to accommodate moulds of different forms (round, square or flat). Moulds 8-15 are forced against extruder 3 by means of a pneumatic or hydraulic press 6 as they are being filled, but so that the end of the mould facing press 6 remains open. When mould 8 has been filled the pressure from press 6 is released, and the operation of extruder 3 is stopped. As mould 8 is filled, the final product designated by 19 is removed from mould 19. Mould holder 4 is rotated, so that the empty mould 9 is moved into registry with the outlet of extruder 3, and mould 8 is moved one position further. Mould 15 is dipped into a container 7, filled with water. The extruder is then re-started. 20 is a handle for rotation of holder 4.

The entire process of emptying a mould, stopping the extruder, removing pressure from the press, rotation, re-applying pressure to the press, can be effected automatically.

An important use of poles made the process according to the invention lies in electricified fencing of fields where cattle is kept, one advantage being that the wires can be passed from pole to pole without the use of insulators.

The process according to the invention is illustrated in and by the following examples. In all the examples, use is made of an apparatus as shown in the accompanying drawings with a screw extruder of the adiabatic type.

EXAMPLE I

The extruder was fed with a mixture containing
30% ground LDPE bags scrap
30% ground HDPE rope scrap
39% ground polypropylene yarn waste
0.6% azodicarbonamide as a blowing agent.

From this mixture poles were made having a diameter of 150 mm and a length of 4000 mm. The specific gravity was 0.82.

EXAMPLE II

The extruder was fed with a mixture of:
15% ground waste paper
25% ground scrap from LDPE bags
39% ground LDPE packing nets
20% ground rope ends of polypropylene
1.0% azodicarbonamide as a blowing agent
From this mixture poles were made of 52 mm×52 mm×1500 mm. The specific gravity was 0.7

EXAMPLE III

The extruder was fed with a mixture of:
10% ground polystyrene coffee cups
40% ground polypropylene margarine tubs
10% saw dust
30% ground HDPE rope waste
0.8% azodicarbonamide as a blowing agent
From this mixture, poles were made of 52 mm×52 mm×1500 mm. The specific gravity was 0.75.

EXAMPLE IV

The extruder was fed with a mixture of:
50% mixed granulated sweepings from the floors of an extrusion department. The sweepings consisted mainly of HDPE;
40% ground polypropylene rope waste from used and severely fauled hawsers;
10% ground sisal scrap;
0.5% azodicarbonamide as the blowing agent.

From this mixture, poles were made having a diameter of 100 mm and a length of 3000 mm. The specific gravity was 0.65.

I claim:

1. A method of molding articles from thermoplastic synthetic material, which comprises the steps of
   (a) simultaneously introducing into an extruder apparatus having no screen member and no extrusion nozzle a quantity of a blowing agent and a mass of material at least 75% of which comprises a thermoplastic synthetic resin material;
   (b) heating and mixing the components in the extruder apparatus to cause the synthetic resin material to be in a fluid condition at atmospheric pressure;
   (c) introducing the mixture at atmospheric pressure into one end of an open ended mold; and
   (d) cooling and removing the mixture from the mold.

2. A method as defined in claim 1, wherein the blowing agent has a threshold temperature that is less than the temperature at which the synthetic material becomes plastic.

3. A method as defined in claim 1, wherein said blowing agent comprises a gas.

4. A method as defined in claim 2, wherein the threshold temperature of the blowing agent is between about 150° C. to about 270° C.

5. An article produced by the method of claim 1.

6. Molding apparatus for forming articles from a mass of a material at least 75% of which consists of a thermoplastic synthetic material, comprising
   (a) a screw extruder having an inlet and an outlet, said screw extruder having no screen member and no extrusion nozzle;
   (b) means for simultaneously introducing into said screw extruder a quantity of a blowing agent and a mass of material at least 75% of which comprises a thermoplastic synthetic resin material, said screw extruder being operable to heat and mix the introduced components to cause the synthetic resin material to be in a fluid condition at atmospheric pressure;
   (c) open-ended mold means for receiving at one end at atmospheric pressure the material supplied from the outlet of said screw extruder; and
   (d) means for cooling the material following the molding thereof in said open-ended mold means.

* * * * *